(12) United States Patent
de la Broise et al.

(10) Patent No.: US 8,861,505 B1
(45) Date of Patent: Oct. 14, 2014

(54) TIMING SYNCHRONIZATION USING BROADCAST SYNCHRONIZATION PACKETS

(75) Inventors: Josselin de la Broise, Palo Alto, CA (US); Raja Banerjea, Sunnyvale, CA (US)

(73) Assignee: Marvell International Ltd. (BM)

( * ) Notice: Subject to any disclaimer, the term of this patent is extended or adjusted under 35 U.S.C. 154(b) by 88 days.

(21) Appl. No.: 13/600,339

(22) Filed: Aug. 31, 2012

Related U.S. Application Data

(60) Provisional application No. 61/530,211, filed on Sep. 1, 2011.

(51) Int. Cl.
*H04J 3/06* (2006.01)

(52) U.S. Cl.
USPC .......... 370/350; 370/310; 370/345; 455/41.2; 455/502

(58) Field of Classification Search
CPC ............................ G01C 21/00; H04L 12/1827
USPC ......... 370/238, 312, 252, 350, 338, 466, 329; 455/3.06, 41.2, 574, 502
See application file for complete search history.

(56) References Cited

U.S. PATENT DOCUMENTS

| | | | | |
|---|---|---|---|---|
| 2009/0298420 A1* | 12/2009 | Haartsen et al. | ............. | 455/3.06 |
| 2012/0196534 A1* | 8/2012 | Kasslin et al. | ............... | 455/41.2 |
| 2012/0257561 A1* | 10/2012 | Redding | ........................ | 370/312 |

* cited by examiner

*Primary Examiner* — Charles C Jiang
*Assistant Examiner* — Walli Butt

(57) ABSTRACT

Systems, methods, and other embodiments associated with timing synchronization using broadcast synchronization packets are described. According to one embodiment, an apparatus a synchronization signal generator configured to generate a synchronization signal based, at least in part, on a first timing signal associated with a first device. The apparatus includes a synchronization packet generator configured to generate a synchronization packet that includes the synchronization signal and an offset time. The offset time corresponds to a delay between i) a time of receipt of the synchronization signal, and ii) a broadcast time of the synchronization packet. An RF synchronization packet emitter is configured to broadcast the synchronization packet, at the broadcast time, for use in synchronizing a second timing signal associated with a second device with the first timing signal.

18 Claims, 5 Drawing Sheets

US 8,861,505 B1

TIMING SYNCHRONIZATION USING BROADCAST SYNCHRONIZATION PACKETS

CROSS REFERENCE TO RELATED APPLICATIONS

This patent disclosure claims the benefit of U.S. Provisional Application No. 61/530,211 filed on Sep. 1, 2011, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

It is sometimes desirable to synchronize a non finite number of wireless devices with a single timing signal. One instance in which many wireless devices are synchronized with a single timing signal is three dimensional (3D) movie viewing systems that utilize actively shuttered viewing glasses. 3D movies that are intended for viewing by shuttered viewing glasses are simultaneously filmed with two cameras. A "right eye" camera films from the perspective of a viewer's right eye while a "left eye" camera films from the perspective of a viewer's left eye.

When the movie is presented, right eye frames are interleaved with left eye frames. Right and left lenses of the glasses are separately shuttered in synchronization with a timing sequence of the interleaved right and left perspective movie frames. A left shutter of the glasses is opened (and a right shutter is closed) when left "eye" frames are presented, and vice versa. The timing sequence of the shutters in each pair of glasses is separately synchronized with the movie's timing sequence. To optimize the viewing experience, the synchronization of the shutters must remain in close synchronization throughout operation of the viewing glasses.

SUMMARY

In one aspect, this patent disclosure describes an apparatus that, in one embodiment, includes a synchronization signal generator, a synchronization packet generator, and an RF synchronization packet emitter. The synchronization signal generator is configured to generate a synchronization signal based, at least in part, on a first timing signal associated with a first device. The synchronization packet generator is configured to generate a synchronization packet having a synchronization packet data field. The synchronization packet data field includes the synchronization signal and an offset time. The offset time corresponds to a delay between i) a time of receipt by the synchronization packet generator of the synchronization signal, and ii) a broadcast time of the synchronization packet. The RF synchronization packet emitter is configured to broadcast the synchronization packet, at the broadcast time, to a second device for use in synchronizing a second timing signal associated with the second device with the first timing signal.

In another aspect, this patent disclosure describes a method that, in one embodiment, includes capturing a first timing signal that is associated with a first device and generating a synchronization signal based, at least in part, on the first timing signal. The method includes, in response to the synchronization signal, generating a synchronization packet having a synchronization packet data field. The synchronization packet data filed includes the synchronization signal and offset time. The offset time corresponds to a delay between i) a time of receipt of the synchronization signal and ii) a broadcast time of the synchronization packet. The method includes broadcasting, to a second device, the synchronization packet at the broadcast time for use in synchronizing a second timing signal associated with the second device with the first timing signal.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

One way to synchronize a number of wireless devices with a single timing signal is to produce an infrared timing pulse that is detected by the wireless devices. Infrared pulses may suffer from a limited range and line of sight difficulties. Thus, it may be desirable to perform a radio frequency (RF) broadcast of the timing signal to the wireless devices. Broadcasting a synchronization signal over radio frequencies can provide extended range and improved reception when line of sight is not guaranteed.

Described herein are methods and apparatus that employ a wireless communication protocol to broadcast synchronization packets containing information about a timing signal to a non finite number of wireless devices. For the purposes of this description, a Bluetooth protocol is selected as the communication protocol. Bluetooth is a communication protocol employed by many types of wireless personal devices to create a short range network between devices using radio transmissions. Other communication protocols and/or synchronization packet structures may also be used to achieve timing synchronization using broadcast synchronization packets.

Figure 1:
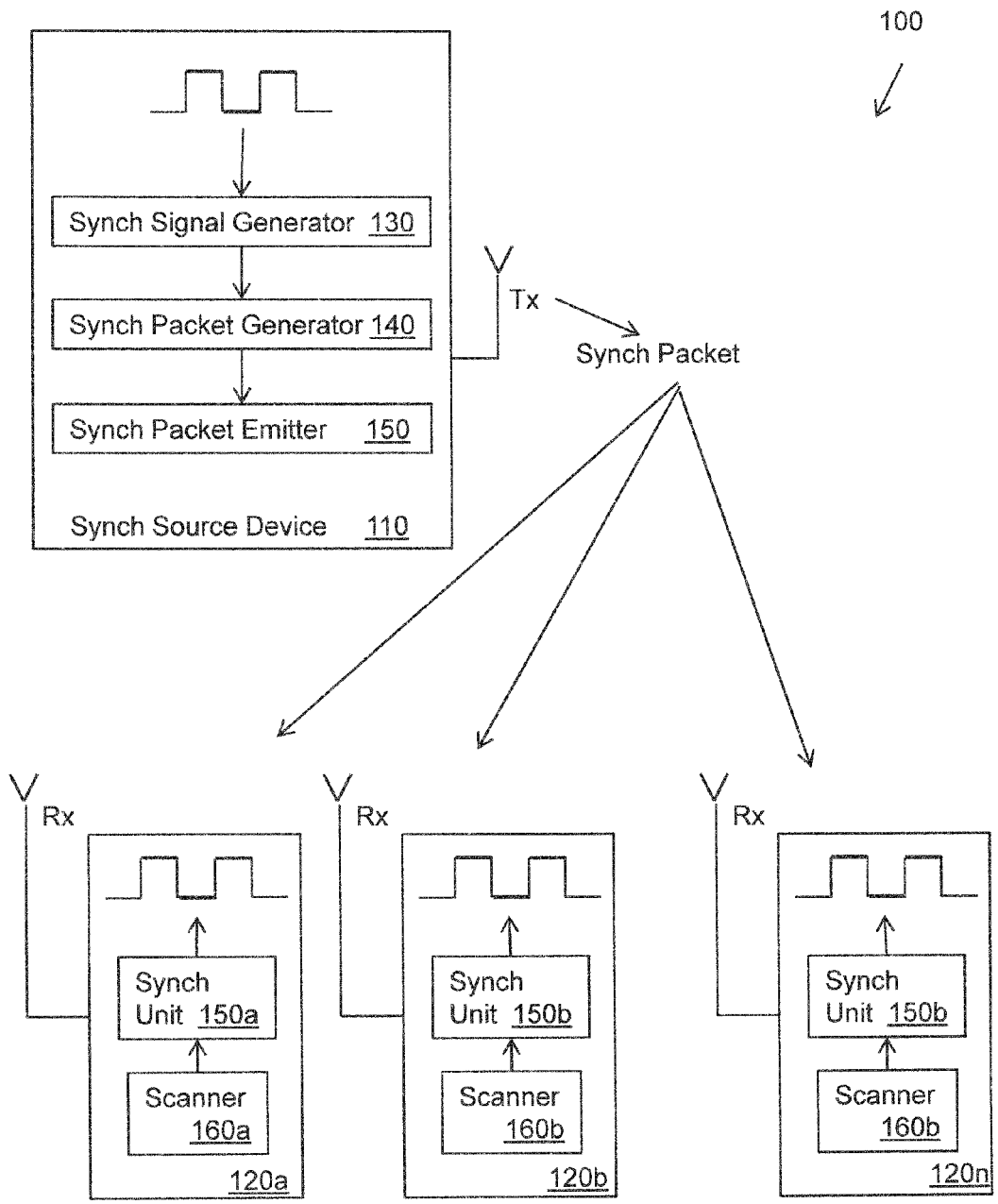
FIG. 1 illustrates one embodiment of an apparatus associated with timing synchronization using broadcast synchronization packets.

With reference to FIG. 1, one embodiment of a wireless network 100 that includes a source device 110 and a non finite number n of wireless devices 120*a*-120*n*. The source device 110 operates according to a source timing signal. The wireless devices 120*a*-120*n* operate according to internal timing signals that are synchronized with the source timing signal. In the 3D movie example above, the device displaying the movie would be the source device 110. The right and left frames would be synchronized according to the source timing signal. The shuttered glasses would be the wireless devices 120a-120n.

In order to maintain synchronization of the wireless devices internal timing signals with the source signal, the source device 110 transmits a synchronization packet. The synchronization packet includes, in various data fields (e.g., payload), information used by the wireless devices to synchronize their internal timing signal with the source signal. The synchronization packet includes a synchronization signal that contains a time of an occurrence of a predetermined source signal timing event (e.g., a number of pulses of the source timing signal) and an offset time that specifies a time difference between when the event occurred and when the synchronization packet is broadcast by the source device 110.

The offset time may be a constant value that the source device 110 waits prior to sending the synchronization packet. Waiting a predetermined offset allows for the source device 110 to compensate for differences in speed with which the synchronization packet can be prepared and broadcasted in different operating conditions. With the synchronization signal and the offset time, the wireless devices 120a-120n can synchronize their internal timing signal with the source timing signal.

To generate and emit synchronization packets, the source device 110 includes a synchronization signal generator 130, a synchronization packet generator 140, and a synchronization packet emitter 150. The synchronization signal generator 130 generates a synchronization signal based, at least in part, on the source timing signal. In one embodiment, the synchronization signal generator generates the synchronization signal every $M^{th}$ pulse of the source timing signal. The value of M can be selected based on how often the wireless devices should be synched with the source timing signal, taking into consideration a processing cost of scanning for the synchronization packet. In one embodiment M is 150.

The synchronization packet generator 140 receives the synchronization signal and generates a synchronization packet that includes the synchronization signal and the offset time. In some embodiments, the synchronization packet includes additional information as will be described in more detail below. The synchronization packet emitter 150 broadcasts the synchronization packet on radio frequency to the wireless devices 120a-120n.

The wireless devices 120a-120n each includes a scanner 160a-160n, respectively, configured to perform a radio frequency scan to receive the synchronization packet. The scanners 160a-160n may be configured to scan for synchronization packets during a limited scanning window. The synchronization packet may include information that is used by the wireless device to determine when to scan for a next synchronization packet. The wireless devices also include a synch unit 150a 150n, respectively, configured to synchronize the wireless device's timing signal with the source timing signal, based, at least in part on the synchronization signal and the offset time found in the synchronization packet.

In the described embodiment, the wireless devices 120a-120n are Bluetooth enabled and the synchronization packet is a Bluetooth Low Energy (BLE) advertising protocol data unit (PDU). Other protocols may be used to broadcast the synchronization signal and offset time to the wireless devices 120a-120n. The BLE advertising PDU is a non-connectable undirected packet that is used in advertising events. Packets of this type are used in broadcasting information to unspecified Bluetooth enabled devices and provide robust transmission even when channels are blocked.

Figure 2A:
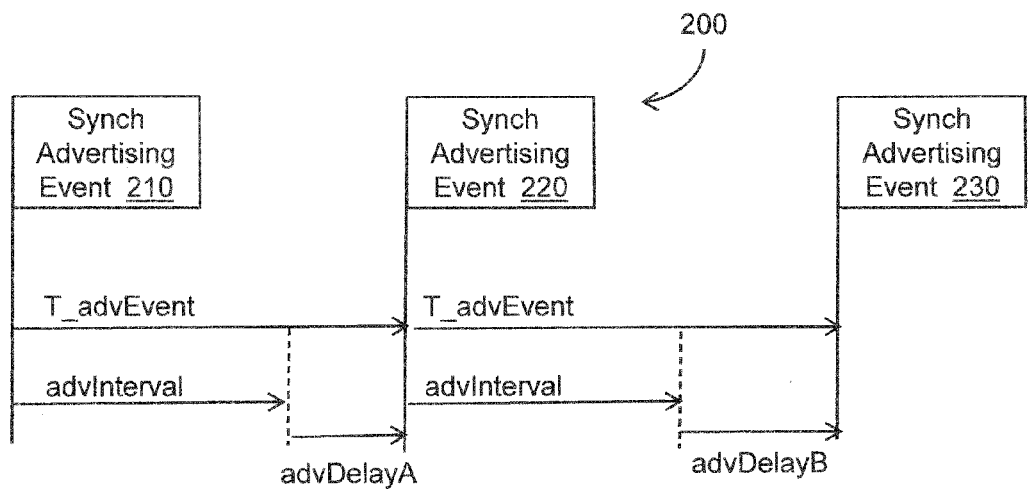
FIGS. 2A and 2B illustrate one embodiment of a protocol for broadcasting synchronization packets.

FIG. 2A is a timeline that illustrates how synchronization packets may be delivered according to a BLE advertising protocol. A series of advertising "events" 210, 220, 230 that are used to broadcast successive synchronization packets are shown on the timeline. Each advertising event occurs at a time T_advEvent after a prior advertising event. To provide a more robust transmission, a time of broadcast for successive advertising events is not a fixed interval, but rather is perturbed in time. The time T_advEvent is defined as a fixed time interval advInterval delayed by a pseudo-random time advDelay. The BLE protocol requires that the time T_advInterval be an integer multiple of 0.625 milliseconds in a range of 100 milliseconds to 10.24 seconds. The BLE protocol requires that the time advDelay be a pseudo-random value with a range of 0 milliseconds to 10 milliseconds generated by a Link Layer for each advertising event.

Figure 2B:
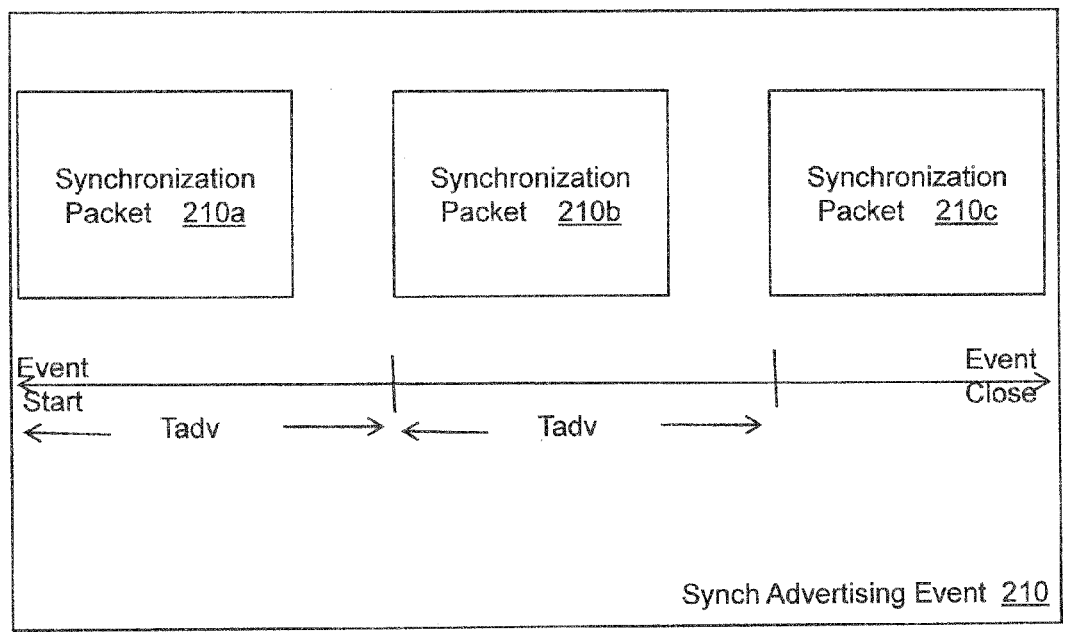

FIG. 2B illustrates components of the advertising event 210 as specified by the BLE protocol. Each advertising event includes three sequential transmissions of the same synchronization packet on three different frequency channels. Broadcasting on three channels avoids interference issues that may arise depending on a broadcast environment. The time between broadcasts of a first and second packet 210a, 210b is equal to the time between broadcasts of a second and third packet. The time between packets, Tadv, is required by the BLE protocol to be less than or equal to 10 milliseconds.

A Bluetooth enabled wireless device is configured to receive BLE advertising PDUs. Thus, when a synchronization packet is broadcast using the BLE advertising packet protocol, the wireless device is configured to process packets according to a communicated value for Tadv, frequency, and so on.

Figure 3:
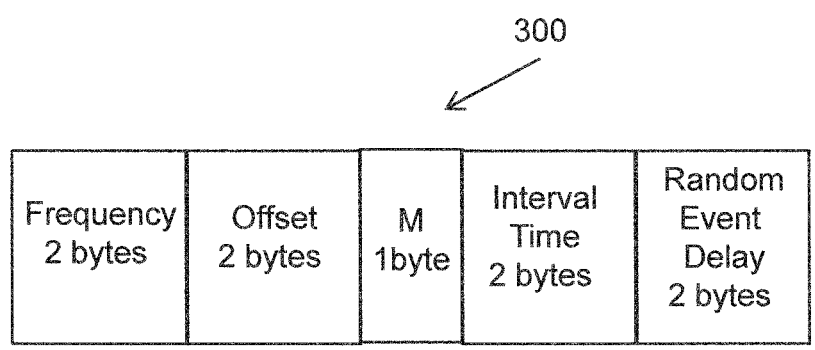
FIG. 3 illustrates one embodiment of a broadcast synchronization packet payload.

FIG. 3 illustrates an example embodiment of a synchronization packet payload 300. The payload 300 includes several data fields. The value for M is the synchronization signal and corresponds to a number of timing signal pulses that elapsed since the last synchronization signal was generated. If the source timing signal and the wireless device timing signal is clocked at the same speed, M pulses of the source timing signal corresponds to the same time duration as M pulses of the wireless device timing signal.

Another payload data field stores a value for the offset time, which is a time that elapsed since the $M^{th}$ source timing signal pulse and broadcast of the packet. With the offset time and the synchronization signal, the wireless device can synchronize its timing signal with the source device timing signal. If the clock used for the source timing signal is the same as or is in sync with the clock used to send advertising events, to determine the offset, a first clock value when the $M^{th}$ pulse is detected may be read. The first clock value is subtracted from a second clock value when the synchronization packet is sent.

In some embodiments, a payload data field includes a value for the frequency on which the packet is broadcast as well as an interval time corresponding to the value for Tadv (e.g., the time between the packets in an advertising event). When the wireless devices are configured to scan during a limited scan window for the synchronization packet, a packet payload data field may store a value for a random event delay corresponding to the value for advDelay for the next synchronization packet's broadcast. Values for advDelay may be read from a stored list of pseudo-random values.

The wireless device can use advDelay to determine when the next synchronization packet will be broadcast, and begin scanning at the determined time. In some embodiments, the offset value and the value for advDelay may be combined. In this case, the offset value is the time difference between the $M^{th}$ source timing signal pulse and the broadcast time of a subsequent advertising event.

Figure 4:
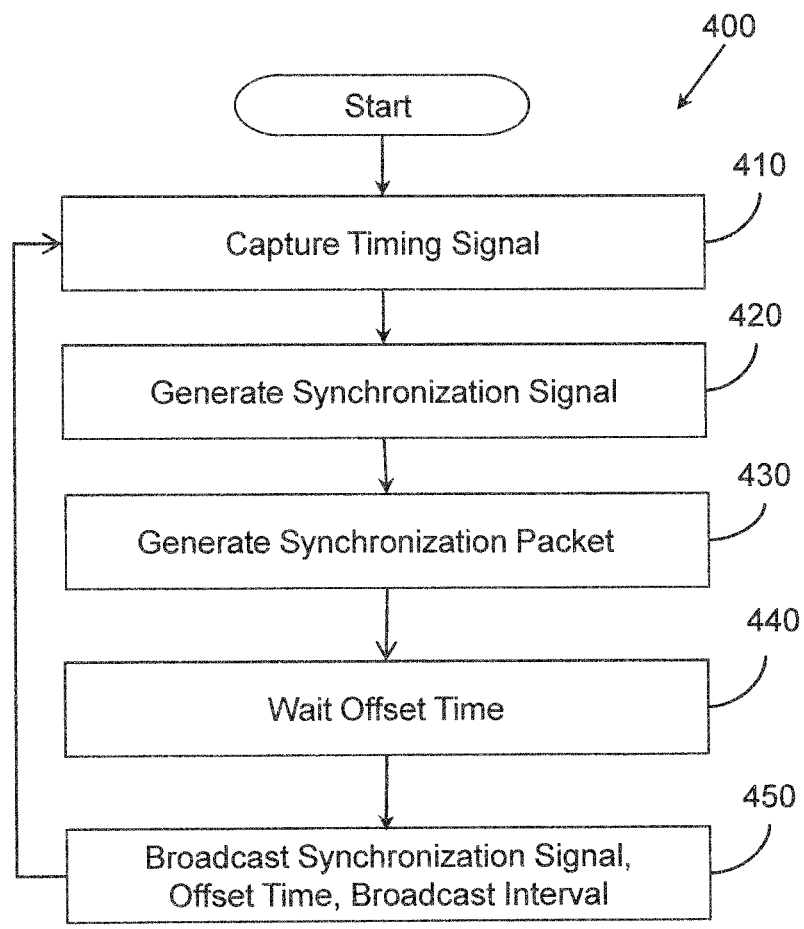
FIG. 4 illustrates one embodiment of a method associated with timing synchronization using broadcast synchronization packets.

FIG. 4 illustrates one embodiment of a method 400 for broadcasting synchronization packets. The method includes, at 410, capturing a source timing signal that is associated with a source device. At 420, the method includes generating a synchronization signal based, at least in part, on the source timing signal. In one embodiment, generating the synchronization signal is performed by signaling that a predetermined number of timing pulses has occurred. At 430, the method includes generating a synchronization packet having a synchronization packet data field that includes the synchronization signal and an offset time. The offset time corresponds to a delay between a time of receipt of the synchronization signal and a broadcast time of the synchronization packet. The method includes, at 440, waiting the offset time and then at 450, broadcasting the synchronization packet to a wireless device for use in synchronizing an internal timing signal of the wireless device with the source timing signal.

In some embodiments, the method 400 includes broadcasting the synchronization packet during a first time interval on a first frequency, during a second time interval on a second frequency, and during a third time interval on a third frequency. The first, second, and third time intervals have substantially the same duration. The method 400 generates a synchronization packet that includes a duration of the first time interval in a synchronization packet data field.

In some embodiments, the method 400 includes generating successive synchronization signals periodically based on the first timing signal and generating successive synchronization packets for each successive synchronization signal. Successive synchronization packets are broadcast at successive broadcast times. A time between successive broadcast times corresponds to a broadcast interval increased by a pseudo-random time value. The method 400 generates a synchronization packet that includes the pseudo-random time value associated with the broadcast time of a next synchronization packet in a synchronization packet data field.

Figure 5:
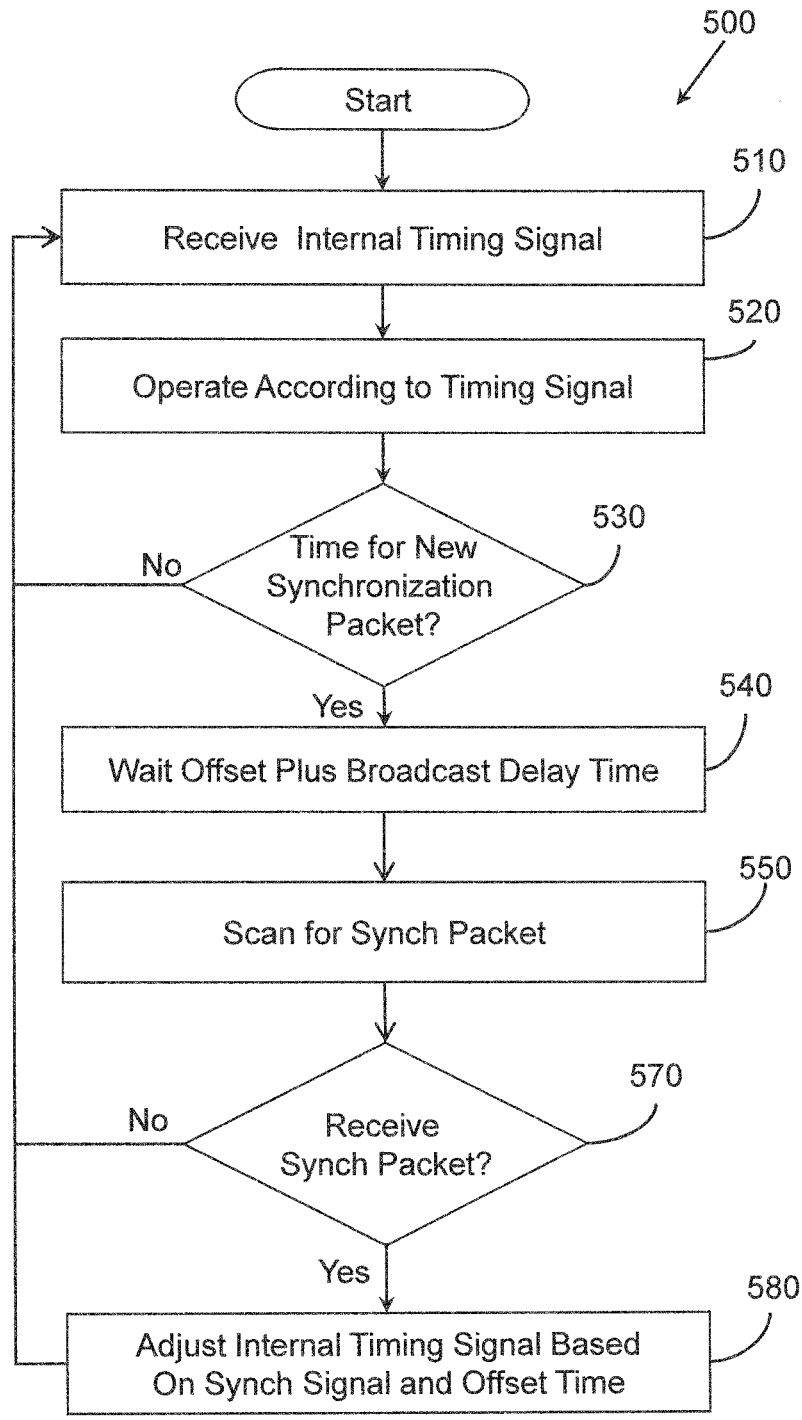
FIG. 5 illustrates one embodiment of a method associated with timing synchronization using broadcast synchronization packets.

FIG. 5 illustrates one embodiment of a method 500 for synchronizing a wireless device using a received broadcast synchronization packet. The method includes, at 510, receiving an internal timing signal for a wireless device and, at 520, operating according to the internal timing signal. At 530, the method includes determining if it is time to scan for a new synchronization packet. In one embodiment, this determination is made by counting internal timing signal pulses up to a predetermined number (e.g., M, as found in a prior synchronization packet). When it is time to scan for a new synchronization packet, the method includes, at 440, waiting the offset time and, optionally, a broadcast interval time (e.g., advDelay) as specified by an immediately prior synchronization packet.

At 450, after waiting the appropriate amount of time, the method includes performing a radio frequency scan for a synchronization packet. At 470, if no synchronization packet is received, the method returns to 410 and the wireless device operates according to the original internal timing signal. Optionally, the internal timing signal may be adjusted for drift. If a synchronization packet is received, at 480 the method includes adjusting the internal timing signal of the wireless device with the source timing signal, based, at least in part on the synchronization signal and the offset time. The internal timing signal may also be adjusted for drift.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus comprising:
   a wireless communication device comprising:
   a synchronization signal generator configured to generate a synchronization signal based, at least in part, on a first timing signal associated with a first device, wherein the timing signal comprises a series of pulses having a constant frequency, further wherein the synchronization signal generator generates the synchronization signal every nth pulse at an event time;

a synchronization packet generator configured to cause the device to generate a synchronization packet having a synchronization packet data field, wherein the synchronization packet data field includes:
  the synchronization signal; and
  an offset time corresponding to a delay between i) the event time, and ii) a broadcast time of the synchronization packet by the device; and
a RF synchronization packet emitter configured to broadcast the synchronization packet, at the broadcast time, to a second device for use in synchronizing a second timing signal associated with the second device with the first timing signal.

2. The apparatus of claim 1, wherein the synchronization signal generator is configured to generate the synchronization signal upon an occurrence of a predetermined number of pulses in the first timing signal.

3. The apparatus of claim 1, wherein the synchronization packet generator is configured to generate a Bluetooth Low Energy (BLE) advertising non-connectable undirected protocol data unit (PDU) that includes the timing signal and offset time in an advertising data field.

4. The apparatus of claim 1, wherein the synchronization packet generator is configured to generate a synchronization packet that includes a frequency on which the synchronization packet is broadcast in the synchronization packet data field.

5. The apparatus of claim 1, wherein:
the synchronization signal generator is configured to generate the synchronization signal upon an occurrence of a predetermined number of pulses in the first timing signal; and
the synchronization packet generator is configured to include the predetermined number of the pulses in the first timing signal in the synchronization packet data field.

6. The apparatus of claim 1, wherein:
for each synchronization packet, the RF synchronization packet emitter is configured to broadcast the synchronization packet during a first time interval on a first frequency, during a second time interval on a second frequency, and during a third time interval on a third frequency; and
wherein the first time interval, the second time interval, and the third time interval have substantially the same duration, and
wherein the synchronization packet generator is configured to generate a synchronization packet that includes a duration of the first time interval in a synchronization packet data field.

7. The apparatus of claim 6, wherein:
the synchronization signal generator is configured to generate successive synchronization signals periodically based on the first timing signal;
the synchronization packet generator is configured to generate successive synchronization packets for successive synchronization signals; and
the RF synchronization packet emitter is configured to broadcast successive synchronization packets at successive broadcast times, wherein a time between successive broadcast times is defined by a broadcast interval increased by a pseudo-random time value,
wherein the synchronization packet generator is configured to include a pseudo-random time value that defines the broadcast time of a next synchronization packet in a synchronization packet data field.

8. A method, comprising:
performing a radio frequency scan and receiving a synchronization packet from a first device, wherein the synchronization packet has a synchronization packet data field that includes:
  a synchronization signal derived from a first timing signal of the first device, wherein the timing signal comprises a series of pulses having a constant frequency, further wherein a synchronization signal is generated every nth pulse at an event time; and
  an offset time that corresponds to a time difference between i) the event time and ii) a broadcast of the synchronization packet by the first device; and
synchronizing a second timing signal of a second device with the first timing signal of the first device, based, at least in part on the synchronization signal and the offset time.

9. The method of claim 8, wherein the scanning comprises scanning for Bluetooth Low Energy synchronization packets.

10. The method of claim 8, wherein:
the synchronization signal is derived periodically upon an occurrence of a predetermined number of pulses in the first timing signal;
successive synchronization packets are broadcast by the first device for successive synchronization signals at successive broadcast times, wherein a time between successive broadcast times is defined by a broadcast interval increased by a pseudo-random time value;
the synchronization packet includes the predetermined number in a synchronization packet data field and the pseudo-random time value; and
the scanning comprises scanning for the synchronization packet upon an occurrence of the predetermined number of pulses in the second timing signal as delayed by an offset time and a pseudo-random time value received in an immediately prior synchronization packet.

11. A method comprising:
capturing a first timing signal that is associated with a first device, wherein the timing signal comprises a series of pulses having a constant frequency;
generating a synchronization signal every nth pulse at an event time;
in response to the synchronization signal, generating a synchronization packet having a synchronization packet data field, wherein the synchronization packet data field includes:
  the synchronization signal; and
  an offset time corresponding to a delay between i) the event time, and ii) a broadcast time of the synchronization packet by the device; and
broadcasting, to a second device, the synchronization packet at the broadcast time for use in synchronizing a second timing signal associated with the second device with the first timing signal.

12. The method of claim 11, wherein:
generating the synchronization signal comprises generating the synchronization signal upon an occurrence of a predetermined number of pulses in the first timing signal; and
generating the synchronization packet comprises generating the synchronization packet to further include the predetermined number in a synchronization packet data field.

13. The method of claim 11, wherein generating the synchronization packet comprises:
generating a Bluetooth Low Energy (BLE) advertising non-connectable undirected protocol data unit (PDU) that includes i) the timing signal and H) the offset time in an advertising data field.

14. The method of claim 11, further comprising:
broadcasting the synchronization packet during a first time interval on a first frequency, during a second time interval on a second frequency, and during a third time interval on a third frequency, and wherein the first time interval, the second time interval, and the third time interval have substantially the same duration,
wherein generating the synchronization packet comprises generating the synchronization packet to further include a duration of the first time interval in a synchronization packet data field.

15. The method of claim 14, further comprising:
generating successive synchronization signals periodically based on the first timing signal;
generating successive synchronization packets for each successive synchronization signal; and
broadcasting successive synchronization packets at successive broadcast times, wherein a time between successive broadcast times corresponds to a broadcast interval increased by a pseudo-random time value,
wherein generating the synchronization packet comprises generating the synchronization packet to further include the pseudo-random time value associated with the broadcast time of a next synchronization packet in a synchronization packet data field.

16. The method of claim 11, further comprising:
performing a radio frequency scan;
receiving a synchronization packet; and
synchronizing a second timing signal of a second device with the first timing signal of the first device, based, at least in part on the synchronization signal and the offset time.

17. The method of claim 16, wherein the scanning comprises scanning for Bluetooth Low Energy synchronization packets.

18. The method of claim 11, wherein:
the synchronization signal is generated upon an occurrence of a predetermined number of pulses in the first timing signal and the synchronization packet includes the predetermined number in a synchronization packet data field; and,
the method further comprises:
identifying the predetermined number in the synchronization packet data field, and
scanning for the synchronization packet upon an occurrence of the predetermined number of pulses in the second timing signal as delayed by an offset time received in an immediately prior synchronization packet.

* * * * *